E. WESTON.
INDEX NEEDLE OR HAND FOR USE WITH ELECTRICAL MEASURING INSTRUMENTS.
APPLICATION FILED NOV. 9, 1909.
1,070,310.
Patented Aug. 12, 1913.
3 SHEETS—SHEET 1.
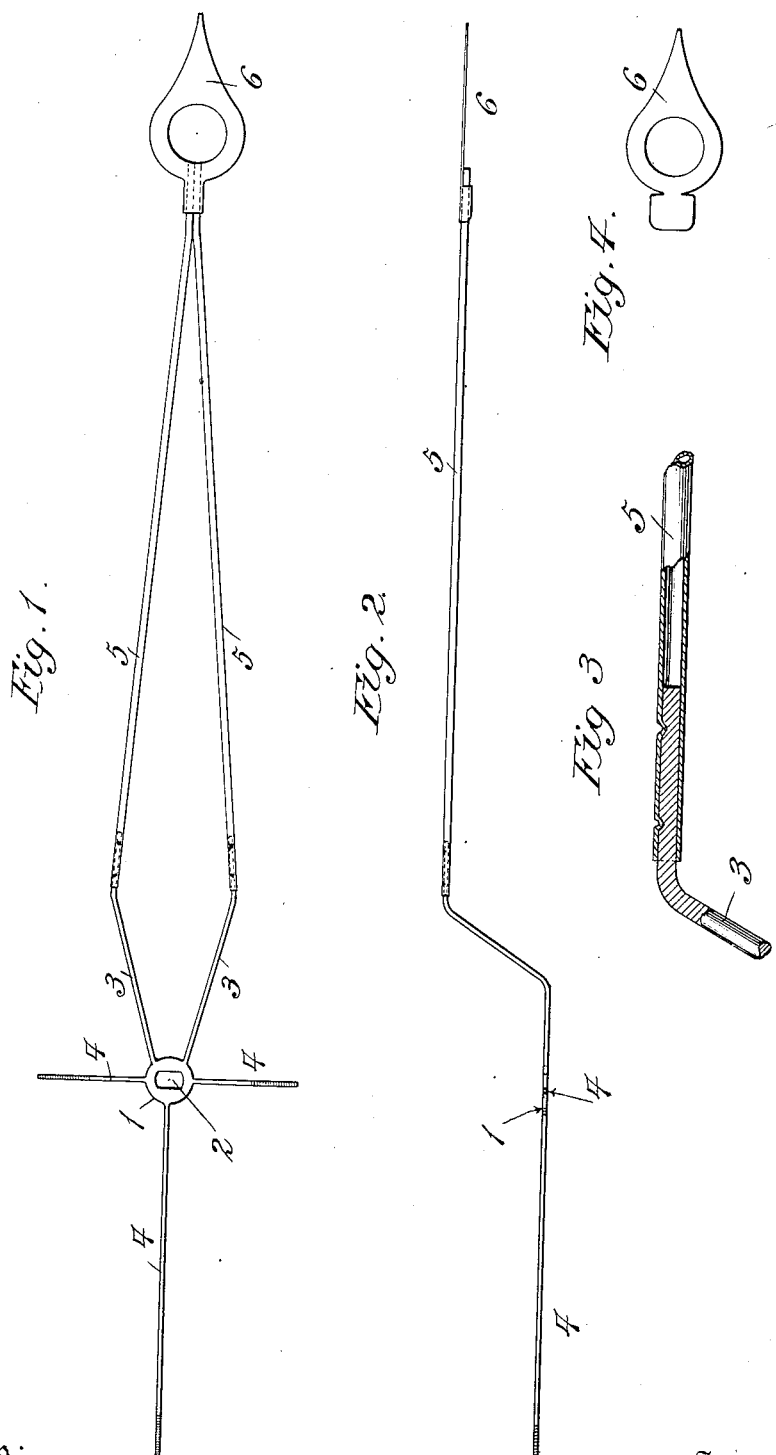

E. WESTON.
INDEX NEEDLE OR HAND FOR USE WITH ELECTRICAL MEASURING INSTRUMENTS.
APPLICATION FILED NOV. 9, 1909.
1,070,310.
Patented Aug. 12, 1913.
3 SHEETS—SHEET 2.
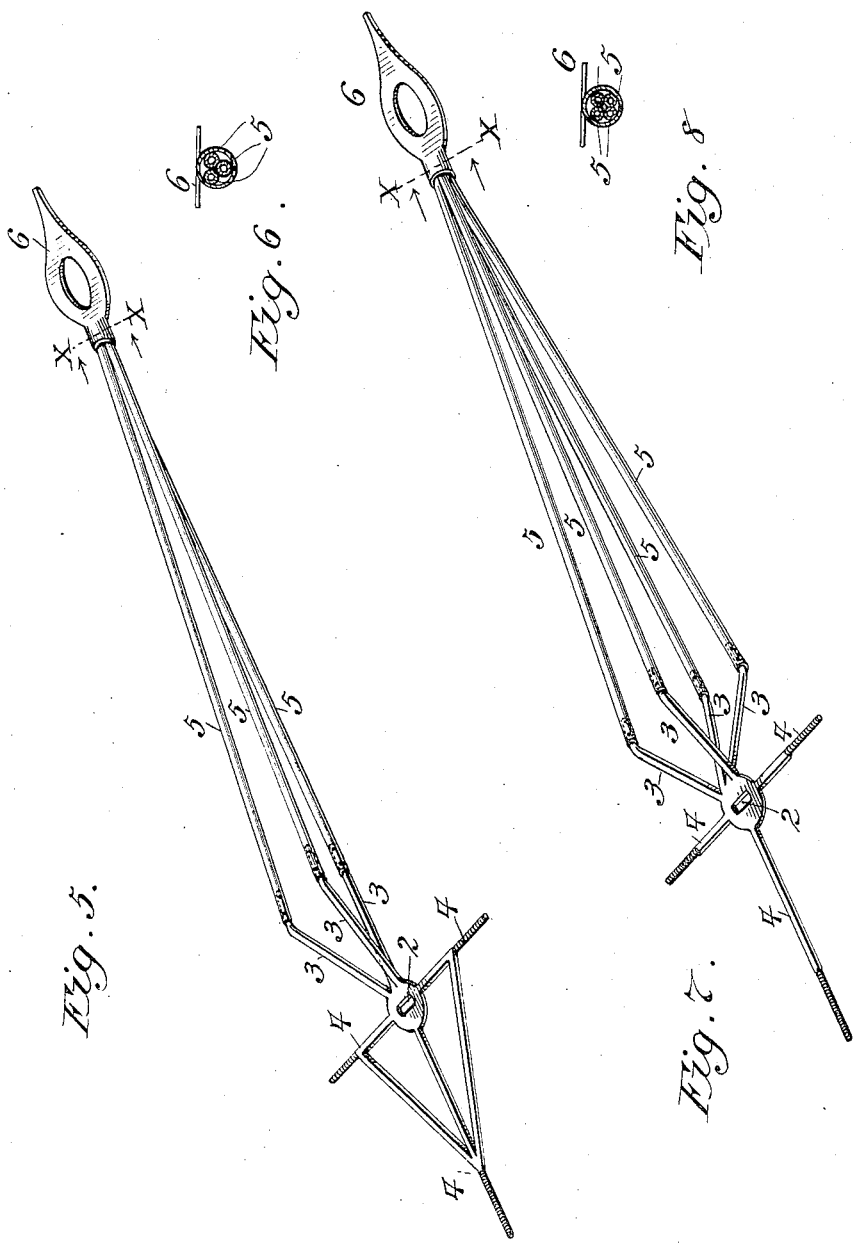

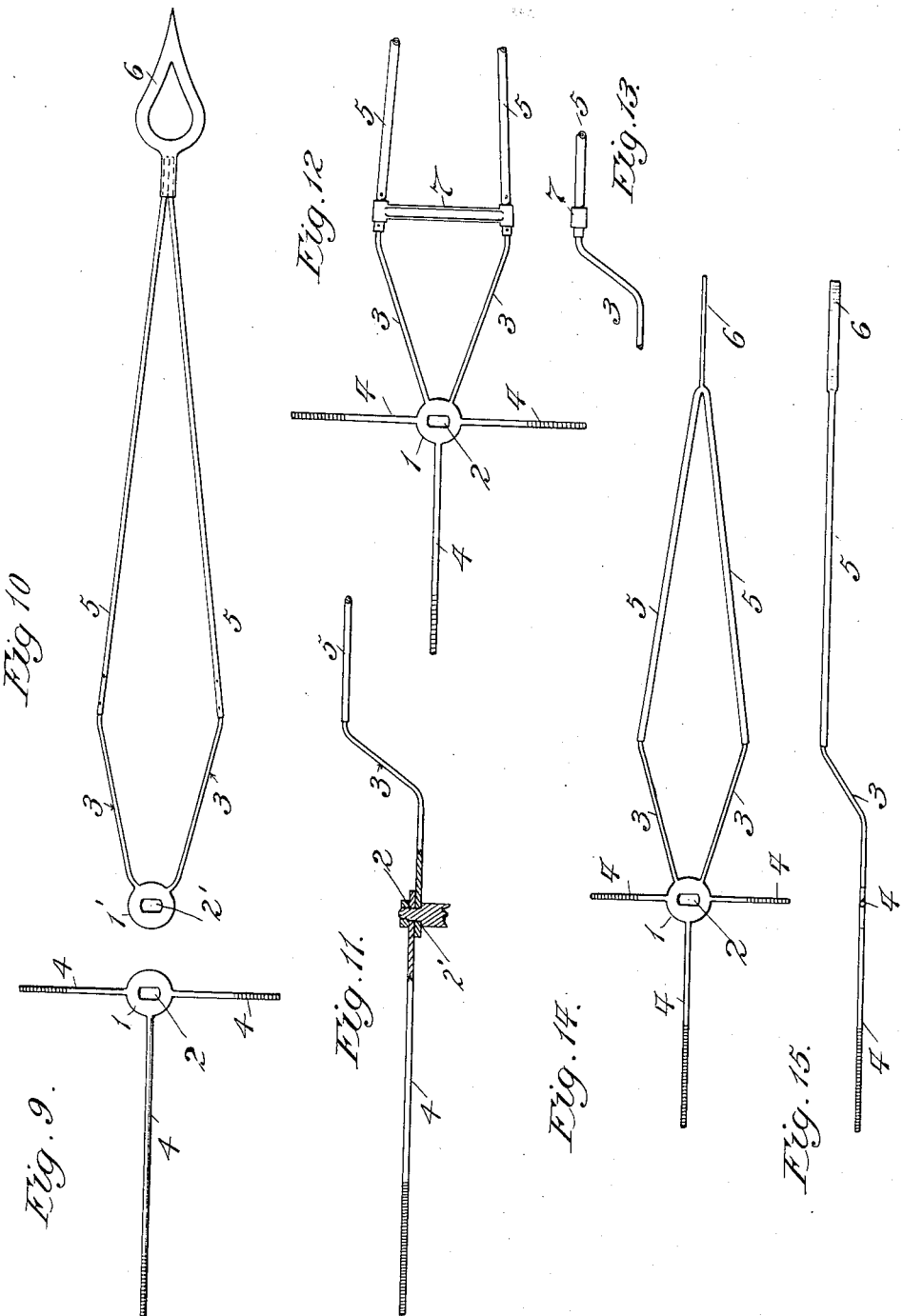

UNITED STATES PATENT OFFICE.

EDWARD WESTON, OF NEWARK, NEW JERSEY, ASSIGNOR TO WESTON ELECTRICAL INSTRUMENT COMPANY. OF WAVERLY PARK, NEW JERSEY, A CORPORATION OF NEW JERSEY.

INDEX NEEDLE OR HAND FOR USE WITH ELECTRICAL MEASURING INSTRUMENTS.

1,070,310.  Specification of Letters Patent.  Patented Aug. 12, 1913.

Application filed November 9, 1909. Serial No. 527,098.

*To all whom it may concern:*

Be it known that I, EDWARD WESTON, a subject of the King of Great Britain, and resident of Newark, county of Essex, and State of New Jersey, have made a new and useful Invention in Index Needles or Hands for Use with Electrical Measuring Instruments, of which the following is a specification.

My invention, broadly speaking, relates to a new form of index needle or hand for use with electrical measuring instruments and is designed to overcome certain serious difficulties now and heretofore encountered in accurately measuring electrical or magnetic quantities in those cases where the value or direction of the forces are rapidly fluctuating or changing; such, for instance, as in the case of alternating currents. In measuring such forces we are confronted with the fact that in much practical and research work the rate of change of direction of the forces and also the magnitude of the change are both likely to vary within extremely wide limits. To illustrate, the frequency (or rate of change of direction of the current) of alternating currents varies in practical work from about 15 cycles to 500 cycles per second, but in research work these limits are frequently much extended. It is, therefore, highly important to be able to make electrical or other measuring instruments intended for use on alternating current circuits which will accurately indicate the value of the forces acting, no matter what the frequency may be within reasonable limits, and no matter how great the fluctuation in the values of those forces may be within reasonable limits. Heretofore this has been practically impossible, owing to the fact that alternating currents set up vibrations in the moving parts of the instrument which are transmitted to and set up more or less violent vibration of the pointer parts of index hands, which vibration frequently becomes so great as to make it impossible to determine its position with reference to the scale marking. It is true that these vibrations of the pointers of index hands of such instruments do not occur at all frequencies, but it is also invariably true that they do or may occur at several different frequencies in the same instrument, and at or about these frequencies the instrument is practically worthless for the purpose for which it is intended.

My invention overcomes these difficulties and by its use I am able to make instruments for use on alternating current circuits of all the widely varying frequencies within the limits of engineering practice in which the moving parts and index needles or hands carried thereby are entirely or practically entirely free from vibration and, therefore, the exact position of the pointer tip of the needle or hand over the scale can be accurately determined and the true value of the force or forces acting be easily ascertained, no matter what the frequency may be or how violent or sudden the change in value of the force or forces may be.

For a full and clear understanding of my invention, such as will enable others skilled in the art to construct and use the same, reference is had to the accompanying drawings, in which, Figure 1 is a plan view of the simplest form of my index needle or hand; and, Fig. 2 is a side elevational view thereof, as seen looking at Fig. 1 from the bottom toward the top of the drawing: Fig. 3 being an enlarged part sectional, part elevational detail view showing the manner of connecting one of the members directly to the fork or balance cross by which the needle or hand is connected to the staff of the movable part of an electrical measuring instrument. Fig. 4 is a plan view of a pointer tip especially adapted for use with the needle or hand of a permanent or central station instrument. Fig. 5 is a perspective view of a modified form of the invention; and Fig. 6 is a sectional view taken through Fig. 5 on the line X—X and as seen looking thereat in the direction of the arrows. Fig. 7 is a perspective view differing slightly in its structure from the form shown in Fig. 5; and Fig. 8 is a sectional view taken through Fig. 7 on the line X—X and as seen looking thereat in the direction of the arrows. Figs. 9 and 10 illustrate conjointly plan views of a modified form of the invention in which the pointer part of the needle and the fork or balance cross are constructed of detachable or separable parts. Fig. 11 is a sectional view taken through the body parts of Figs. 9 and 10 and illustrating the manner of connecting the two parts of that form of the invention shown in said figures to the staff of the movable part of the instrument, the pointer tip, however, not being shown in this view. Fig. 12 is a plan view of that form of the invention shown in Fig. 1, illustrating also a further means of increasing the rigidity of the device through the agency of a counter-brace or member, the extreme ends of the other members which carry the pointer tip being broken away. Fig. 13 is a detail side elevational view of a part of Fig. 12 and as seen looking thereat from the bottom toward the top of the drawings. Fig. 14 is a plan view of a modified form of the invention somewhat similar to the form shown in Fig. 1, but having an especial adaptability for use in connection with portable instruments. Fig. 15 is a side elevational view of Fig. 14 as seen looking thereat from the bottom toward the top of the drawings.

Referring now to the drawings in detail and first to Figs. 1 to 4 inclusive, 1 represents the fork or balance cross having at its center an elongated staff opening 2 and provided with screw-threaded counter-balance or weight supporting arms 4, 4, 4, and two additional arms 3, 3, having substantially the angular relation to the fork or balance cross shown, this structural device being stamped, at one operation, out of light sheet metal, such as aluminum. 5, 5 represent angular members made preferably of finely drawn tubes of aluminum, to the outer interconnected ends of which is attached a pointer tip 6 also stamped out of thin sheet metal, as aluminum, and secured thereto by wrapping the flat lugs or ears at the inner end around such outer ends and then cementing the parts securely together. The arms 4, 4, are screw-threaded at their outer ends for the purpose of receiving the usual counter-weights. The arms 3, 3, are bent so as to assume the angular relations in different planes indicated in Figs. 1 and 2, and the outer ends thereof are then bent so as to coincide with the converging angular relation of the tubular ends of the two members 5, 5. They are then coated with cement and inserted into these hollow ends, as shown in enlarged view Fig. 3, after which they are further permanently secured together by staking or indenting them with a prick punch. After the counter-weights are put in place the needle or hand as thus constructed is ready for use.

In Figs. 5, 6, 7 and 8 I have illustrated in perspective views further modified forms of the invention in which in one instance there are three sets of conjoint members 5, 5, 5, and arms 3, 3, 3, secured to the fork or balance cross, which cross in the form shown in Fig. 5 embraces three members, the central one of which may, if preferred, be done away with, while in Fig. 7 this cross is similar to Fig. 1 insofar as the counter-weight supporting arms is concerned. It will be observed that the construction of the forks shown in Figs. 5 and 7 are such that the members 5, 5, are located in different planes, thus preventing, as far as possible, resonant vibration, in either a horizontal or a vertical direction, or in both directions. Figs. 6 and 8 illustrate the manner of connecting the pointer tip to the outer ends of the members 5, 5, 5.

In Figs. 9, 10 and 11 I have shown a still further modified form of the invention, in which the fork or balance cross 1 and the trussed parts proper are constructed in individual or separable parts, so that they may be joined together as a whole and secured to the staff 2' of the movable part of the instrument. In this form of the invention the fork or balance cross is stamped out of a thin sheet of metal, as aluminum, and the supporting part of the members 5, 5 and arms 3, 3 are stamped out of a second sheet of light metal, and the respective arms 3, 3, 4, 4, given a cylindrical conformation or shape in any preferred manner, so that a minimum amount of metal is embodied in each instance and the arms 4, 4, 4, put in immediate condition for cutting the screw-threads on the outer ends thereof, while the outer ends of the arms 3, 3, are also adapted to be quickly and easily inserted into the tubular ends of the members 5, 5. This form of the invention possesses especial merit in that the arms 4, 4 of the fork or balance cross, the arms 3, 3 of the supporting part for the members 5, 5, and these members themselves are all of cylindrical form and therefore possess minimum lightness and are of relatively great rigidity.

In Figs. 12 and 13 I have illustrated a form of the invention in which the structure is not essentially different from that shown in Figs. 1 and 2, except that a cross member 7 is provided which connects the two members 5, 5 together, said cross member being made of light sheet metal, such as aluminum and provided with longitudinal webs as shown, the opposite ends thereof being of sleeve like form and secured to the members 5, 5, as shown. This cross member is slipped into position over the ends of the members 5, 5, before such ends are secured to the arms 3, 3; or, it may be secured to the members by winding the extended ends of the member 7 about the joint ends of the members 5, 5, and arms 3, 3, after they are secured together in a manner similar to that in which the pointer tip 6 is secured to the outer ends of the same members. This form of the invention possesses especial utility in that it has greater rigidity than the like structural form shown in Figs. 1 and 2 and prevents to a very great extent any torsional or twisting effects, thereby constituting a structure which is not liable in any sense to be subject to resonant vibrations, such as will interfere with the reading at the end of the pointer tip.

Figs. 14 and 15 illustrate a form of the invention substantially like that shown in Figs. 1 and 2, except that this form has an especial utility in connection with portable instruments, the only essential difference between the device shown in Figs. 14 and 15 and that shown in Figs. 1 and 2 being that the two members 5, 5 in said Figs. 14 and 15 are formed from one continuous piece of tubing bent at its middle back upon itself so as to have the acute angular relation shown in Fig. 14, and after being so bent cement is applied to the adjoining surfaces and the pointer tip 6 is formed by flattening the same through the agency of a pair of pliers, or in any preferred way, thus producing a thin narrow pointer tip. A pointer and pointer tip for an index needle or hand as thus constructed, in which the two members 5, 5 are integrally connected with the tip, gives increased rigidity at the outer end and, therefore, practically prevents resonant vibrations, such as will interfere with the reading at the end of the pointer tip.

I do not limit my invention to the details of construction illustrated in the accompanying drawings, as obviously various modifications will suggest themselves to those skilled in the art which would embody the essential feature of preventing resonant vibrations of such pointers by utilizing the truss or rigid effects of variously disposed members and interrelated cross members. To illustrate, the entire index needle or hand might be constructed by stamping it out as a whole from a relatively thin sheet of light metal, such as aluminum, so that all of the parts thereof, including the fork or balance cross 1 the counter-weight arms 4, 4, 4, the members 5, 5, of the pointer proper, the supporting arms 3, 3, therefor, and the pointer tip 6, are embraced in one integral piece and the members 3, 3, of such needle might be afterward bent into the conformation shown in Fig. 2; or all of the parts of such needle might be located in a common plane. It is also obvious that the form shown in Figs. 9, 10 and 11 might be constructed in this manner of two parts in which the arms 3, 3, members 5, 5 and pointer tip 6 would be in one integral piece and the fork or balance cross 1 and arms 4, 4, 4 in an independent integral piece, all such modifications falling within the generic scope of my invention.

It will thus be seen that in all the forms I have provided a hand or pointer made up of a plurality of longitudinally disposed diverging and converging members comprising the parts 3 and 5, to form a sort of trussed structure.

It will further be readily understood that when a disturbing vibration or resonant effect acting in the plane or planes of said members, tends to move the pointer tip in either direction, said members will be subjected to longitudinal stresses or strains in opposite directions, but owing to the stiffness of the structure, the metal of said members will not be appreciably distorted by these stresses or strains, and no appreciable energy will be stored up; consequently, no reacting spring-like vibrations result from said forces, and therefore a non-vibratory needle of a minimum weight, moment of inertia and momentum for a given rigidity results.

I make no claim hereinafter to the modified form shown in Figs. 14 and 15 of the drawings, as this constitutes the subject matter of a divisional application bearing Serial No. 752,568, filed by me on the 7th day of March, 1913.

Having thus described my invention what I claim and desire to secure by Letters Patent of the United States is:

1. A non-vibrating index needle or hand for electrical measuring instruments comprising a plurality of diverging and converging members separated from and rigidly secured at an angle to each other.

2. A non-vibrating index needle or hand for electrical measuring instruments comprising a fork or balance member and a plurality of converging and diverging members rigidly secured to said balance member and to each other.

3. An index needle or hand for electrical measuring instruments comprising a plurality of converging and diverging members separated from and rigidly secured at an angle to each other; a pointer tip associated with said members; and a fork or balance cross also associated with said members.

4. An index needle or hand for electrical measuring instruments comprising a plurality of converging and diverging members separated from and rigidly secured at an angle to each other; a counter-weight arm associated with said members; and means adapted to be connected with the instrument for moving said members and counter-weight arm.

5. An index needle or hand for electrical measuring instruments comprising a plurality of diverging members rigidly secured at an angle to each other; a pointer tip associated with said members; and a common support for said members.

6. An index needle or hand for electrical measuring instruments comprising a plurality of bent members separated from and rigidly secured at an angle to each other; a pointer tip associated with said members;

a common support for said members; and a plurality of counter-weight arms connected with said common support.

7. An index needle or hand for electrical measuring instruments comprising a plurality of cylindrical outwardly bent members separated from and rigidly secured at an angle to each other; a fork or balance cross having counter-weight arms connected to one end of said members; and a pointer tip connected to the other end of said members.

8. An index needle or hand for electrical measuring instruments comprising a plurality of cylindrical diverging and converging members, each composed of a plurality of parts secured together, and having a fork or balance cross integral with a pair of said parts.

In testimony whereof I have signed my name to this specification in the presence of two subscribing witnesses.

EDWARD WESTON.

Witnesses:
C. J. KINTNER,
M. F. KEATING.